No. 833,239. PATENTED OCT. 16, 1906.
C. F. PLUNKETT.
PIPE COUPLING FOR WATER CLOSETS, &c.
APPLICATION FILED APR. 12, 1905.
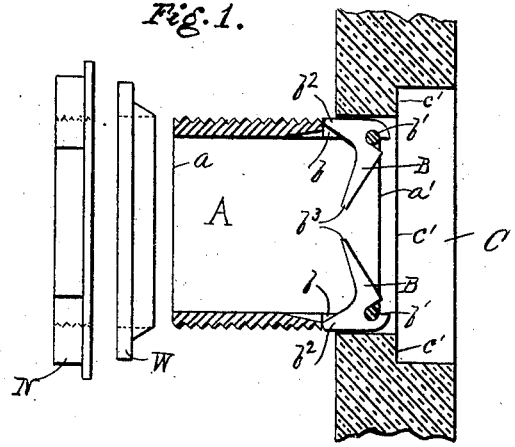
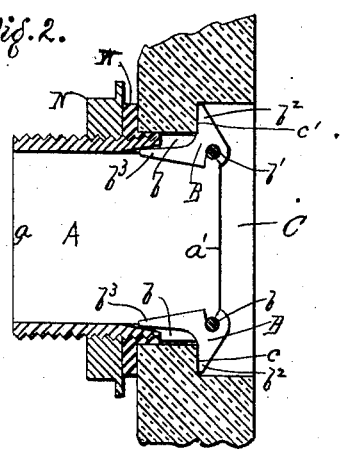 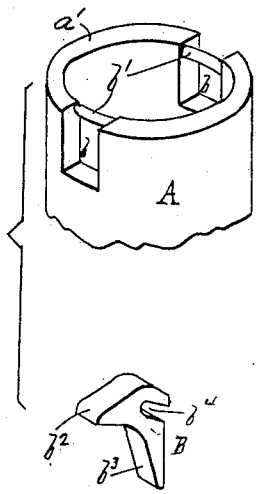
WITNESSES
Paul A. Blair.
Walter Abbr.
INVENTOR
Christopher F. Plunkett
BY
Howson and Howson
ATTORNEYS

# UNITED STATES PATENT OFFICE.

CHRISTOPHER F. PLUNKETT, OF NEW YORK, N. Y., ASSIGNOR OF ONE-FOURTH TO JAMES J. PLUNKETT, OF NEW YORK, N. Y.

PIPE-COUPLING FOR WATER-CLOSETS, &c.

No. 833,239.     Specification of Letters Patent.     Patented Oct. 16, 1906.

Application filed April 12, 1905. Serial No. 255,229.

*To all whom it may concern:*

Be it known that I, CHRISTOPHER F. PLUNKETT, a citizen of the United States of America, residing in the borough of Manhattan, city, county, and State of New York, have invented an Improved Pipe-Coupling for Water-Closets, &c., of which the following is a specification.

My invention relates to improved pipe-couplings, and while applicable in various connections it is especially adapted to connect water-pipes to earthenware or other bowls, such as water-closets, where a direct threaded connection would be impossible or impracticable.

The object of my invention is to produce such a coupling, which will not only be air and water tight, but will be simple, strong, and efficient, which can be applied without special skill and will be cheap to manufacture and have fewer parts than those now on the market for a similar purpose.

Other objects and advantages will be obvious from the construction hereinafter set forth, and from the accompanying drawings, which form a part of this specification.

In the drawings, Figure 1 represents a sectional elevation of my device, with its parts separated and the pipe entering the earthenware body. Fig. 2 is a similar view after the connection has been made and with the several parts in place. Fig. 3 is a perspective view of details.

The main body of my coupling consists of a pipe A, threaded at its outer end $a$ in the usual manner for connection with standard piping. The inner end $a'$ of the tube A may be left plain on its exterior surface, and it is provided with two or more slots $b$ to receive a corresponding number of claws B, which are pivoted to the pipe in any suitable way, as by pivot-bars $b'$, which span the outer ends of the slots.

The claws B are substantially L-shaped, one leg $b^2$ being adapted to project laterally outward from the pipe and engage the inner shoulder of the earthenware C, while the other, $b^3$, lying within the pipe and being longer than its slot $b$, is adapted to bear at its end against the inner face of the pipe. The apex of the angle may have a recess or jaw $b^4$, Fig. 3, to receive the pivot-bar $b'$, the outer end of the jaw being then sufficiently closed around the pivots by a suitable tool, so that the claw will be retained on its pivot, Figs. 1 and 2. It will also be seen that the jaws are pivoted in such a position to enable them to be swung entirely within the limits of the outer circumference of the pipe.

In making the connection or coupling the end $a'$ of the pipe A is inserted into the opening $c$ of the part C, representing a portion of the earthenware bowl, and which has an inner annular shoulder $c'$ around the opening. The claws B swing back on their pivots as the pipe end is passed inward through the opening $c$, but after passing the annular shoulder legs $b^2$ of the claws will or can be made to swing outward and engage the shoulder. The opposite legs $b^3$, which are longer, engage the inside of the pipe to hold the parts in position. A rubber washer or packing-gasket W, of suitable material, is then slipped on the pipe A and against the outside of the earthenware bowl, and the joint is made tight by means of a nut N, screwed on the threaded portion $a$ of the tube against the washer W.

I claim as my invention—

1. A pipe-coupling comprising a threaded pipe at its outer end and slotted at its inner end, pivoted holding-claws within the slots in the said pipe, said pipe and claws adapted to be inserted within the opening of the part to be connected, one end of said claws adapted to bear against the inner face of the pipe.

2. A pipe-coupling, comprising a pipe threaded at its outer end and slotted at its inner end, pivoted L-shaped claws within said slots, one leg of each claw being adapted to engage an inner shoulder on the part to which the pipe is to be connected, and the other leg to bear against the inner surface of said pipe.

3. A pipe-coupling, comprising a pipe threaded at its outer end and slotted at its inner end, pivots spanning said slots, and pivoted L-shaped claws within the slots having a recess at the apex to receive the pivot-bar, one end of said claws adapted to bear against the inner face of the pipe.

4. A pipe-coupling, comprising a pipe threaded at its outer end and slotted at its inner end, pivoted claws in said slots in the said pipe adapted to be swung entirely within the limits of the outer circumference of the pipe.

5. A pipe-coupling, comprising a threaded pipe slotted at its inner end, pivoted claws in said slots in the said pipe, said claws being L-shaped with one leg longer than the other and pivoted at its apex.

In testimony whereof I have signed my name to this specification in the presence of two subscribing witnesses.

CHRISTOPHER F. PLUNKETT.

Witnesses:
HUBERT HOWSON,
EDNA W. COLLINS.